United States Patent [19]

Torn et al.

[11] 3,918,672

[45] Nov. 11, 1975

[54] DIRECTORY ASSEMBLY

[75] Inventors: Lawrence J. Torn, Woodbury, Long Island; David F. Cammarota, Massapequa, both of N.Y.

[73] Assignee: Redyref-Pressed & Welded, Inc., Long Island City, N.Y.

[22] Filed: Dec. 20, 1973

[21] Appl. No.: 426,947

[52] U.S. Cl. .................. 248/447; 403/98; 403/116
[51] Int. Cl.[2] .................. A47B 97/04
[58] Field of Search .............. 248/447; 403/98, 116

[56] References Cited

UNITED STATES PATENTS

| | | | |
|---|---|---|---|
| 562,988 | 6/1896 | Van Meter | 248/447 |
| 1,569,596 | 1/1926 | Walsh | 248/447 |
| 2,060,171 | 11/1936 | Burton | 403/98 X |
| 2,612,427 | 9/1952 | Faulkner et al. | 248/447 X |
| 2,719,739 | 10/1955 | Copeland | 403/98 |
| 3,028,701 | 4/1962 | Popper | 248/447 |
| 3,317,176 | 5/1967 | Herrin | 248/447 |

*Primary Examiner*—William H. Schultz
*Attorney, Agent, or Firm*—Gottlieb, Rackman, Reisman & Kirsch

[57] ABSTRACT

A directory assembly is provided for mounting a telephone directory to a telephone shelf. The directory assembly includes a mounting mechanism which enables the telephone directory to be pivoted beneath the telephone shelf from a first or storage position to an intermediate or swing-out position and thereafter to a swing-up position to rest on the telephone shelf. The mounting mechanism is adjusted to select the storage and swing-out positions from several possible such positions.

6 Claims, 7 Drawing Figures

DIRECTORY ASSEMBLY

This invention relates generally to directory assemblies and, more particularly, to a directory assembly for mounting a single telephone directory to a telephone shelf in pre-selected positions.

Directory assemblies have heretofore been provided for receiving a plurality of telephone directories. For example, the telephone directories are mounted, one next to the other, in a series of metal binders, with each metal binder receiving the binding of a telephone directory. A common axis or rod extends between the metal binders, and the metal binders lie flush with each other to form, in part, the work shelf or surface on which the telephone directories are opened. When it is necessary to refer to a particular telephone directory, pressure is applied to one end of the metal binder holding the selected telephone directory and the binder pivots about the common axis carrying the telephone directory to an open position wherein the telephone directory rests on the work shelf.

Although this type of assembly has the advantage of mounting a plurality of telephone directories in out of the way storage positions when the directories are not in use, with a telephone directory easily movable to an open position for quick reference, there are nonetheless several disadvantages in this assembly. For example, the directory assembly is for use with a plurality of telephone directories and is not for use with a single telephone directory. In addition, the directory assembly is quite large in size requiring a relatively large amount of space for operation and a large separate work shelf is required. This becomes a severe limitation in those instances in which the assembly must be mounted in relatively small confines, e.g., within a telephone booth or the like. Lastly, the directory assembly is relatively costly to manufacture and somewhat difficult to install.

Accordingly, it is an object of the present invention to provide a directory assembly for use with a single telephone directory.

Another object of this invention is to provide a directory assembly which is adjustably mounted thereby enabling the assembly to be used in relatively small spaces.

Yet another object of this invention is to provide a directory assembly which is relatively inexpensive to manufacture, rugged in configuration and easy to install.

These and other objects of the present invention are accomplished by providing a directory assembly having a binder adapted to receive the binding of a telephone directory. A mounting mechanism is provided for mounting the binder beneath a telephone shelf, said mounting mechanism including means for enabling said binder to swing up from beneath the telephone shelf so that the telephone directory opens on the top of the telephone shelf. The mounting mechanism also includes means for enabling the binder to pivot beneath the telephone shelf from a first or storage position to an intermediate or swing-out position. Means are provided for preselecting the storage and swing-out positions, said means including adjustable screws selectively engaging the ends of arcuate slots to limit the pivotal movement of said binder.

The above brief description of the present invention will be more fully appreciated by reference to the following detailed description of a presently preferred but nonetheless illustrative embodiment, when considered in conjunction with the accompanying drawing, wherein.

Figures 1, 2, 3:
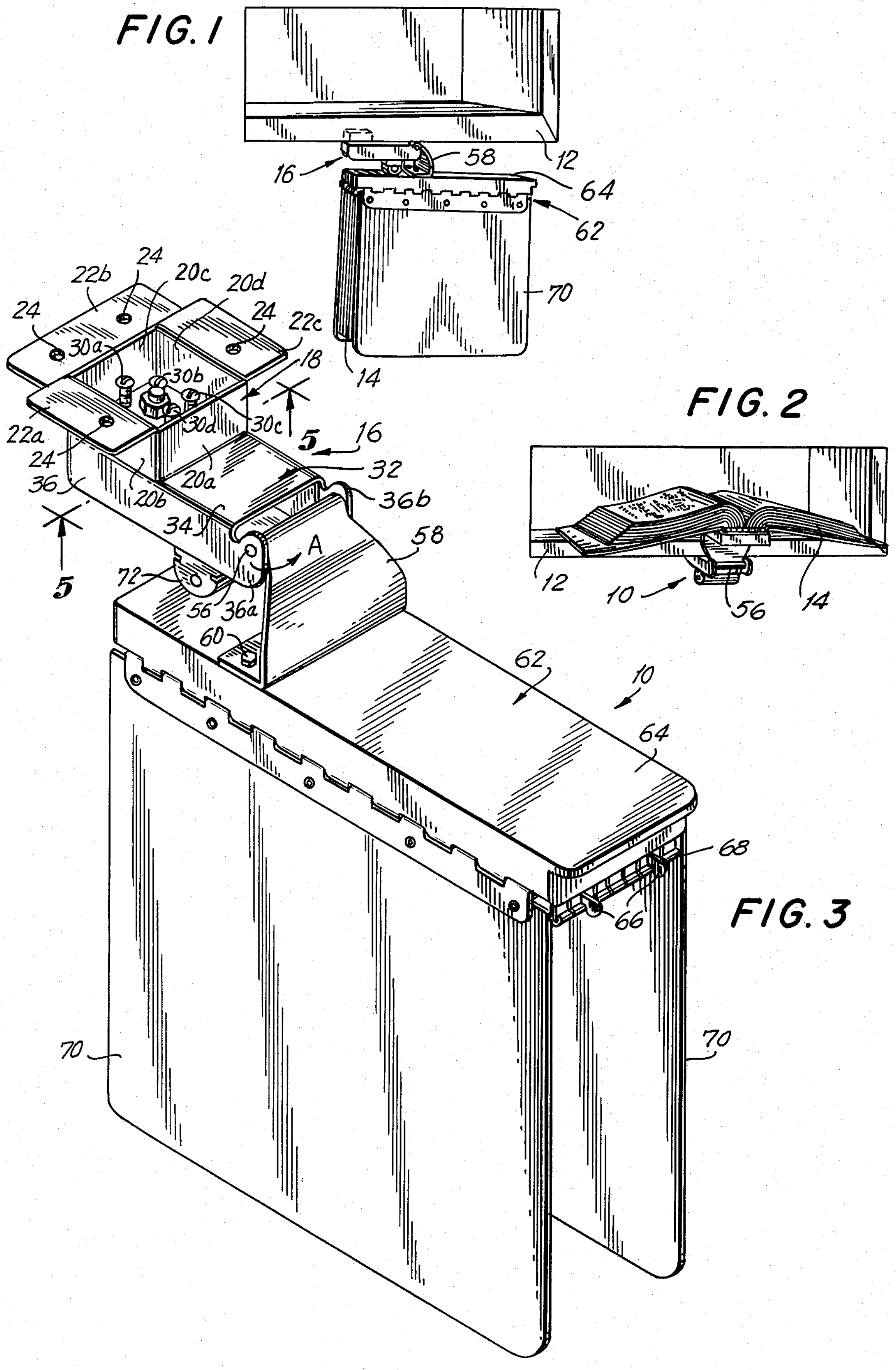
FIG. 1 is a front perspective view showing a directory assembly according to the present invention, with the directory assembly mounted beneath a telephone shelf in a first or storage position.
FIG. 2 is a view similar to that of FIG. 1, but showing the directory assembly in a final or swing-up position.
FIG. 3 is a perspective view of the directory assembly of the present invention.

Referring now to the drawings and, more particularly, to FIGS. 1–3 thereof, a directory assembly according to the present invention is generally designated 10. The directory assembly 10 is adapted to be secured to a telephone shelf or similar support surface 12, with the directory assembly receiving a telephone directory 14 or similar type of reference book. As used hereinafter, the term "telephone directory" means and includes any book which may be received by the assembly 10.

Directory assembly 10 includes a mounting mechanism, generally designated 16, for securing the directory assembly to the bottom side of telephone shelf 12. The mounting mechanism is adjustable to select the storage and swing-out positions of the directory assembly by limiting the pivotal rotation of the directory assembly beneath the shelf 12. As will be explained, this enables a storage position and a swing-out position to be selected from several possible such positions, and this enables the directory assembly to be used with telephone shelves and telephone installations of different sizes and shapes.

Mounting mechanism 16 includes a support housing 18 which is permanently secured to the bottom side of telephone shelf 12. The support housing 18 includes four erect side walls 20*a*, 20*b*, 20*c* and 20*d* and three outwardly extending adjoining mounting flanges 22*a*, 22*b*, and 22*c*. The mounting flanges define mounting holes 24 which are adapted to receive bolts 26 (see FIGS. 5–7), or similar fastening elements, which are utilized to secure support housing 18 to the telephone shelf. The top of housing 18 is open, while the bottom thereof includes a relatively thick bottom wall 28 (see FIG. 7).

As illustrated in FIG. 3, four positioning elements, i.e., screws 30*a*, 30*b*, 30*c* and 30*d*, are disposed in appropriate holes which extend through bottom wall 28. The screws are selectively disposed within bottom wall 28 so that the ends of the screws either project through the bottom wall or do not project through the bottom wall (compare screws 30*b* and 30*d* in FIG. 7). The pivotal movement of directory assembly 10 beneath telephone shelf 12 and the storage and swing-out positions for telephone directory 14 are defined by selecting which of screws 30*a*–30*d* project through the bottom wall, the screws acting as stop means as will be explained.

Figure 7:
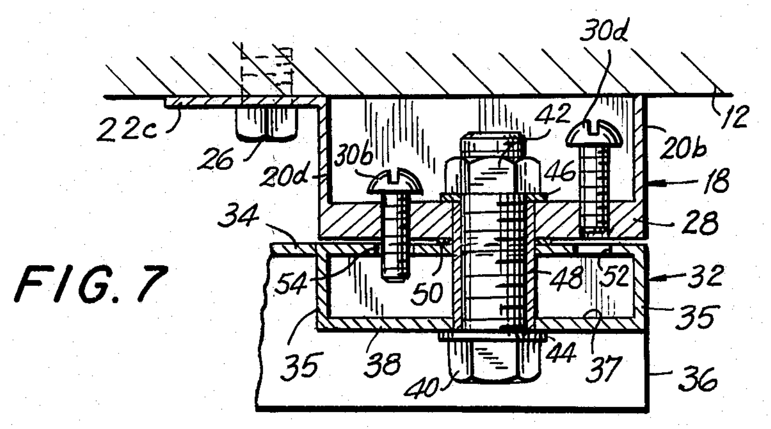
FIG. 7 is a sectional view, taken substantially along the line 7—7 of FIG. 6.

A pivot arm 32 also forms part of mounting mechanism 16, is disposed beneath support housing 18 and is adapted to be pivoted at one of its ends about the support housing. Pivot arm 32 includes a top wall 34 and depending side walls 36 which extend along the entire length of the pivot arm. An intermediate spacer wall 38 (see FIG. 7) extends between side walls 36 at the end of the pivot arm beneath housing 18, the intermediate wall being parallel to and beneath top wall 34. Intermediate wall 38, top wall 34 and a pair of end walls 35 define a screw-receiving chamber 37 which, as indicated in FIG. 7, is generally disposed beneath housing 18.

Pivot arm 32 is pivotally connected to support housing 18 by a bolt 40 which extends from intermediate wall 38, through top wall 34 of pivot arm 32, and through bottom wall 28 of support housing 18. A nut 42, disposed at the top of bottom wall 28, engages bolt 40 to support the pivot arm beneath the support housing. Bolt 40 thus forms the axis about which pivot arm 32 rotates or pivots, relative to housing 18. Washers 44, 46 (see FIG. 7) disposed, respectively, between the head of bolt 40 and intermediate wall 38 and between nut 42 and bottom wall 28, may also be included, if so desired. A thrust bearing (not shown) may also be included, disposed beneath nut 42 or substituted therefor.

To facilitate the pivotal movement of pivot arm 32 about bolt 40 relative to support housing 18, the bolt is inserted into a sleeve 48 which extends between the washers 44, 46. Bottom wall 28 of support housing 18 and top wall 34 of pivot arm 32 are maintained a slight distance apart, also to facilitate pivotal rotation, by a washer 50 (see FIG. 7) which is inserted about sleeve 48 between wall 28 and wall 34 in order to reduce the friction between the support housing and the pivot arm as the housing and arm rotate relative to each other.

Figures 4, 5, 6:
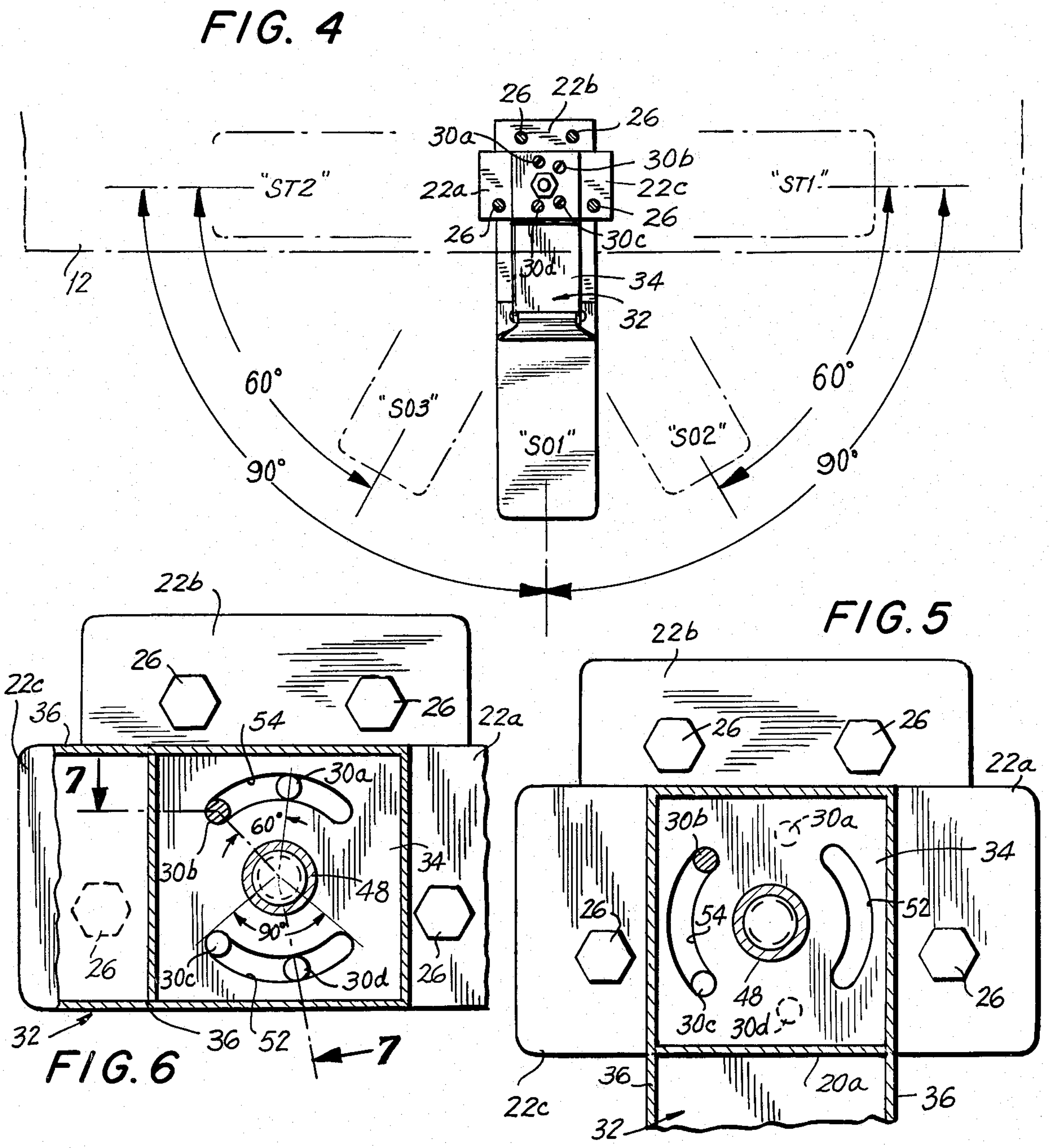
FIG. 4 is a top plan view of the directory assembly showing the various storage and swing-out positions which may be selected.
FIG. 5 is a bottom sectional view, enlarged in scale, taken substantially along the line 5—5 of FIG. 3 and corresponding to the directory assembly being in the intermediate or swing-out position.
FIG. 6 is a view similar to that of FIG. 5, but corresponding to the directory assembly being in the first or storage position.

As illustrated in FIGS. 5 and 6, two opposed 90° arcuate slots 52, 54 (see FIG. 6), are defined in top wall 34 of pivot arm 32, in the area of the top wall that is beneath the support housing. These arcuate slots 52, 54 are adapted to receive the ends of screws 30*a*–30*d*, depending on the orientation of pivot arm 32 with respect to support housing 18 and also dependent on which of these screws are rotated so as to extend through bottom wall 28. By way of example, screws 30*a*, 30*b* provide a first series of screws which selectively cooperate with slot 54 while screws 30*c*, 30*d* provide a second series of screws which selectively cooperate with slot 52.

The orientation of screws 30*a*–30*d* should also be noted. Referring to FIG. 6, it will be appreciated that screws 30*a*, 30*b*, 30*c* and 30*d* are each disposed at approximately the same radial distance from bolt 40. Additionally, if screw 30*b* is taken as a point of reference, then screw 30*a* is 60° from screw 30*b*, screw 30*d* is 210° from screw 30*b*, and screw 30*c* is 270° from screw 30*b* and is also 60° from screw 30*d*.

At the other end of the pivot arm opposite support housing 18, the side walls 36 of pivot arm 32 extend past top wall 34 to define side wall extensions 36*a*, 36*b* (see FIG. 3). Disposed between the side wall extensions is a shaft 56 which supports, for pivotal rotation, a tongue 58 which is wrapped around shaft 56 at one end thereof. The other end of tongue 58 is connected, via bolts or rivets 60, to a binder, generally designated 62, which receives telephone directory 14.

As is generally well-known, binder 62 includes a binder back 64, formed of metal or similar material, which is connected to tongue 58, and which receives the binding of telephone directory 14. The binding of the telephone directory is inserted between adjustable rods 66 which extend the length of binder back 64, with the rods thereby maintaining the telephone directory in place within binder 62. To accommodate telephone directories of different thicknesses, the adjustable rods 66 are movable within a variable rod support 68 located at one of the binder back 64, so that the rods can accept bindings of various thicknesses. Binder covers or flaps 70 are also included as part of binder 62, and these are rotatably connected to the edges of binder back 64 so that the covers can be opened or closed, much the same as the covers of a book.

A rubber bumper 72, is disposed on the underside of pivot arm 32, between the side walls 36. The bumper is adapted to abut binder back 64 to act as a stop (see FIG. 1), and it also absorbs the shock as the telephone directory is swung down from its opened position illustrated in FIG. 2.

As indicated hereinbefore, mounting mechanism 16 of directory assembly 10 enables the directory assembly to be mounted or secured to a telephone shelf and to assume selected storage and swing-out positions. This is a result of the cooperation of support housing 18 with pivot arm 32 and, specifically, as a result of the cooperation of screws 30*a*–30*d* disposed within the bottom wall 28 of the housing with the arcuate slots 52, 54 disposed in the top wall 34 of the pivot arm. By selecting which screw, or series of screws, engage slots 52, 54 to act as stops within the slots, the pivotal rotation of pivot arm 32 about support housing 18 is defined and this determines the storage and swing-out positions of the directory assembly.

By way of example, FIGS. 1, 2, 5 and 6 illustrate the pivotal movement of pivot arm 32 about support housing 18 when screw 30*b* is the only screw which is tightened to extend through bottom wall 28 of the support housing and with pivot arm 32 oriented with respect to the housing so that screw 30*b* is disposed within arcuate slot 54 (see FIG. 7).

With screw 30*b* disposed within slot 54, the directory assembly 10 is connected to the underside of telephone shelf 12. By way of example, and as illustrated in the drawing, support housing 18 is secured to shelf 12 by bolts 26, with the support housing oriented such that mounting flange 22*b* is toward the rear of the telephone shelf, mounting flange 22*a* to the left and mounting flange 22*c* to the right, as viewed in FIG. 4. It should be noted, however, that the orientation of support housing 18 with respect to telephone shelf 12 is a matter of choice, with the orientation being a function of the size of the shelf as well as a function of the desired swing-out and storage positions.

With screw 30*b* tightened, with pivot arm 32 so oriented with respect to support housing 18 and with the support housing so oriented with respect to shelf 12, the directory assembly defines a first or storage position ST1 beneath shelf 12 and an intermediate or swing-out position SO1 (see FIG. 4). As illustrated in FIG. 6, when the directory assembly is in storage position ST1, screw 30*b* and slot 54 cooperate so that screw 30*b* abuts one end of slot 54 (see FIG. 6) and pivot arm 32 is oriented with respect to housing 18 such that the binder 62 carrying telephone directory 14 is beneath shelf 12, as shown in FIGS. 1 and 4.

To use the telephone directory, the directory assembly must be moved from its first or storage position ST1 to its intermediate or swing-out position SO1 and thereafter to a final or swing-up position in which the telephone directory can be opened to rest on shelf 12 (see FIG. 2).

Specifically, as the directory assembly is moved from storage position ST1 to swing-out position SO1, pivot arm 32 pivots about bolt 40 90°, with the pivot arm moving until the other end of slot 54 abuts screw **30*b* (see FIG. 5). The directory assembly thus reaches its intermediate or swing-out position SO1 in which pivot arm 32 is now directly in front of a user, screw 30*b*** acting as a stop to limit further rotation of the pivot arm.

To refer to the telephone directory, the user now grasps binder 62 and rotates the binder and telephone directory 14 which is carried by it upwardly; rotating tongue 58 about shaft 56 in the direction of arrow A of FIG. 3, until the telephone directory reaches its final or swung-up position, shown in FIG. 2. In this position, the telephone directory can be opened to rest on telephone shelf 12, and may be easily referred to.

When the user is finished referring to the telephone directory, the binder is closed, and the directory assembly swings back to its intermediate or swing-out position SO1, with tongue 58 rotating about shaft 56 in the opposite direction. That is, binder swings downwardly, as tongue 58 rotates about shaft 56 in the direction opposite to arrow A, until the binder back 64 hits rubber bumper 72 which not only stops further rotation but also absorbs the shock of the sudden stop in rotation. Pivot arm 32 is then rotated in the opposite direction until the directory assembly reaches its first or storage position, ST1. The storage position is again defined by that position in which slot 54 limits further movement of the pivot arm by abutting screw **30*b* at the position illustrated in FIG. 6.**

It will be appreciated that the degree of pivotal movement or rotation of pivot arm 32 about bolt 40 and, therefore, the degree of pivotal movement of the pivot arm relative to the fixed support housing 18 is determined when the respective ends of arcuate slots 52, 54 abut screws **30*a***, 30*b*, 30*c* and **30*d*. Thus, for the example heretofore described, pivot arm 32 rotates about support housing 18 a full 90° since screw 30*b* is the only screw within slot 54 and pivot arm 32 is allowed to rotate the full angular distance defined by arcuate slot 54, that is, 90°.**

In contrast, if screw **30*d* is also tightened along with screw 30*b* (so that screw 30*d* is inserted into slot 52 and screw 30*b* is inserted into slot 54 before support housing 18 is secured to the shelf) then as pivot arm 32 is rotated about bolt 40, the pivot arm will rotate only until the end of arcuate slot 52 hits screw 30*d*. Specifically, and referring to FIG. 6, as pivot arm 32 is rotated in the direction of arrow B, the pivot arm will rotate only until the lefthand end of slot 52 engages or hits screw 30*d*. As a result, pivot arm 32 is no longer free to travel the entire angular distance defined by slot 54; rather, rotation is limited when screw 30*d* reaches the end of arcuate slot 52 after 60° of angular rotation of the pivot arm relative to the housing. This corresponds, for example, to the directory assembly being pivoted between storage position ST1 and a new swing-out or intermediate position SO2 (see FIG. 4) which is 60°** from storage position ST1.

In a similar manner, if screw **30*c* is the only screw which is tightened to cooperate with slot 52, pivot arm 32 will rotate relative to support housing 18 from a second storage position ST2 (see FIG. 4), with the pivot front of shelf 12. On the other hand, if screw 30*a* is tightened along with screw 30*c*, the rotation of pivot arm 32 relative to the housing is cut down to 60° from storage position ST2 so that the directory assembly will assume a swing-out position SO3, shown in FIG. 4. (To simplify FIG. 4, the orientation of support housing 18 relative to telephone shelf 12 has remained unchanged. It should be understood, however, that support housing 18 should be secured to shelf 12** to either be in alignment with positions ST1, ST2, SO2 or SO3, if SO1 is not the selected swing-out position.)

It will be appreciated, therefore, that the directory assembly according to the present invention may be utilized to mount a telephone directory at pre-selected storage and swing-out positions, thereby enabling the telephone directory to be utilized with telephone shelves of diverse shapes and sizes. The directory assembly is easy to install and relatively inexpensive to manufacture. Moreover, it should be apparent that different storage and swing-out positions may be obtainable, such as by increasing or decreasing the length of slots 52, 54, and/or by changing the positions of screws **30*a*–30*d*. For example, in the embodiment described hereinbefore, swing out positions SO2 and SO3 which are, respectively, 60° from storage positions ST1 and ST2, may be changed to 45° from the storage positions by placing screw 30*a* 45° away from screws 30*b* and by placing screw 30*d* 45° away from screw 30*c*.**

Obviously, other modifications are to be contemplated within the scope of the present invention. Accordingly, it is to be understood that the embodiment described is merely illustrative of the present invention and other embodiments are to be contemplated, within the scope of the present invention, as set forth by the appended claims.

What is claimed is:

1. A directory assembly for use with a mounting surface comprising a binder adapted to receive a telephone directory; a mounting mechanism adapted to be secured to the mounting surface; means for pivotally connecting said binder to said mounting mechanism for enabling said binder to move relative to said mounting mechanism in a first plane; said mounting mechanism including a support housing adapted to be secured to said mounting surface, a pivot arm pivotally movable about said support housing for enabling said binder to more relative to said mounting mechanism in a second plane substantially perpendicular to said first plane wherein the movement of the binder in said second plane is independent of movement of the binder in said first plane, means cooperating with said pivot arm and said support housing for selectively limiting the pivotal movement of said pivot arm about said support housing, where said means for selectively limiting the pivotal movement of said pivot arm about said support housing includes positioning elements and slot means, said positioning elements selectively engaging said slot means to limit said pivotal movement and wherein said support housing includes a bottom wall, said positioning elements being disposed within said bottom wall, and said pivot arm includes a top wall defining said slot means, said positioning elements being selectively disposed to extend through said bottom wall to engage said slot means.

2. A directory assembly according to claim 1 wherein said slot means includes at least one arcuate slot defined in said top wall and said position elements include at least one positioning element adapted to extend into said arcuate slot to abut at least one end of said arcuate slot as said slot moves relative to said position element to limit the pivotal movement of said pivot arm about said support housing.

3. A directory assembly according to claim 1 wherein said slot means includes at least two arcuate slots defined in said top wall and said position elements include at least two positioning elements adapted to be disposed so that one positioning element extends into one of said arcuate slots and the other positioning element extends into the other of said arcuate slots, said one positioning element adapted to abut one end of said one slot to limit the pivotal movement of said pivot arm about said support housing in one direction and said other positioning element adapted to abut one end of said other arcuate slot to limit the pivotal movement of said pivot arm about said support housing in the opposite direction.

4. A directory assembly according to claim 1 further comprising bolt means extending at least between said bottom wall of said support housing and said top wall of said pivot arm, a sleeve disposed about said bolt means, and means for separating said bottom wall and top wall to facilitate the pivotal movement of said pivot arm about said support housing.

5. A directory assembly for use with a telephone shelf comprising a binder adapted to receive a telephone directory including a binder back for receiving the binding of said telephone directory and binder covers movable relative to said binder back and adapted to be disposed over the covers of said telephone directory; a mounting mechanism for mounting said binder beneath a telephone shelf in a storage position or a swing-out position beneath said telephone shelf; said mounting mechanism including a pivot arm supporting said binder for pivotal movement from said swing-out position to a swing-up position on top of said telephone shelf, a support housing adapted to be fastened to said telephone shelf for supporting said pivot arm, means for pivotally connecting said support housing to said pivot arm including a pivot shaft disposed between said support housing and said pivot arm and means for limiting the pivotal movement of said pivot arm about said pivot shaft, said limit means including a first series of stop means selectively projecting from said support housing and adapted to be individually inserted into a first arcuate slot defined in said pivot arm and a second series of stop means selectively projecting from said support housing and adapted to be individually inserted into a second arcuate slot defined in said pivot arm, the engagement of said first and second stop means within said first and second arcuate slots selectively limiting the pivotal movement of said pivot arm about said pivot means.

6. A directory assembly according to claim 5 wherein said first and second arcuate slots each define arcs of at least 90° and said first series of stop means and said second series of stop means each include two screws disposed less than 90° from each other.

* * * * *